United States Patent [19]

van Mi

[11] 4,308,639
[45] Jan. 5, 1982

[54] APPARATUS FOR REMOVING THE VERTICAL VERTEBRAE FROM THE NECK OF SLAUGHTERED FOWLS

[75] Inventor: Martinus P. G. van Mil, Boxmeer, Netherlands

[73] Assignee: Stork PMT B.V., Netherlands

[21] Appl. No.: 155,435

[22] Filed: Jun. 2, 1980

[30] Foreign Application Priority Data

Jun. 12, 1979 [NL] Netherlands ........................ 7904602

[51] Int. Cl.³ .............................................. A22C 21/00
[52] U.S. Cl. .......................................... 17/11; 17/12
[58] Field of Search ........................... 17/11, 11.1, 12

[56] References Cited

U.S. PATENT DOCUMENTS

| 3,510,907 | 5/1970 | Rejsa et al. | 17/11 |
| 3,958,303 | 5/1976 | Scheier | 17/11.1 R |
| 3,965,534 | 6/1976 | Harben, Jr. | 17/11 |
| 4,035,867 | 7/1977 | Meyn | 17/11 |
| 4,091,503 | 5/1978 | Fox et al. | 17/11 |
| 4,097,960 | 7/1978 | Graham et al. | 17/11 |

FOREIGN PATENT DOCUMENTS

| 7316489 | 6/1975 | Netherlands | 17/11 |
| 7502569 | 9/1976 | Netherlands | 17/11 |

*Primary Examiner*—Willie G. Abercrombie
*Attorney, Agent, or Firm*—Newton, Hopkins & Ormsby

[57] ABSTRACT

An apparatus for removing the cervical vertebrae from the skin of the neck of slaughtered fowls comprises a frame movable along the track of the fowls, and bears a fixed first clamping unit and a second clamping unit pivoting around a horizontal shaft and connected with a control unit such, that in a movement of the frame along the track the clamping units move toward each other, enclose the neck of the fowl, and are then jointly moved downwardly.

11 Claims, 3 Drawing Figures

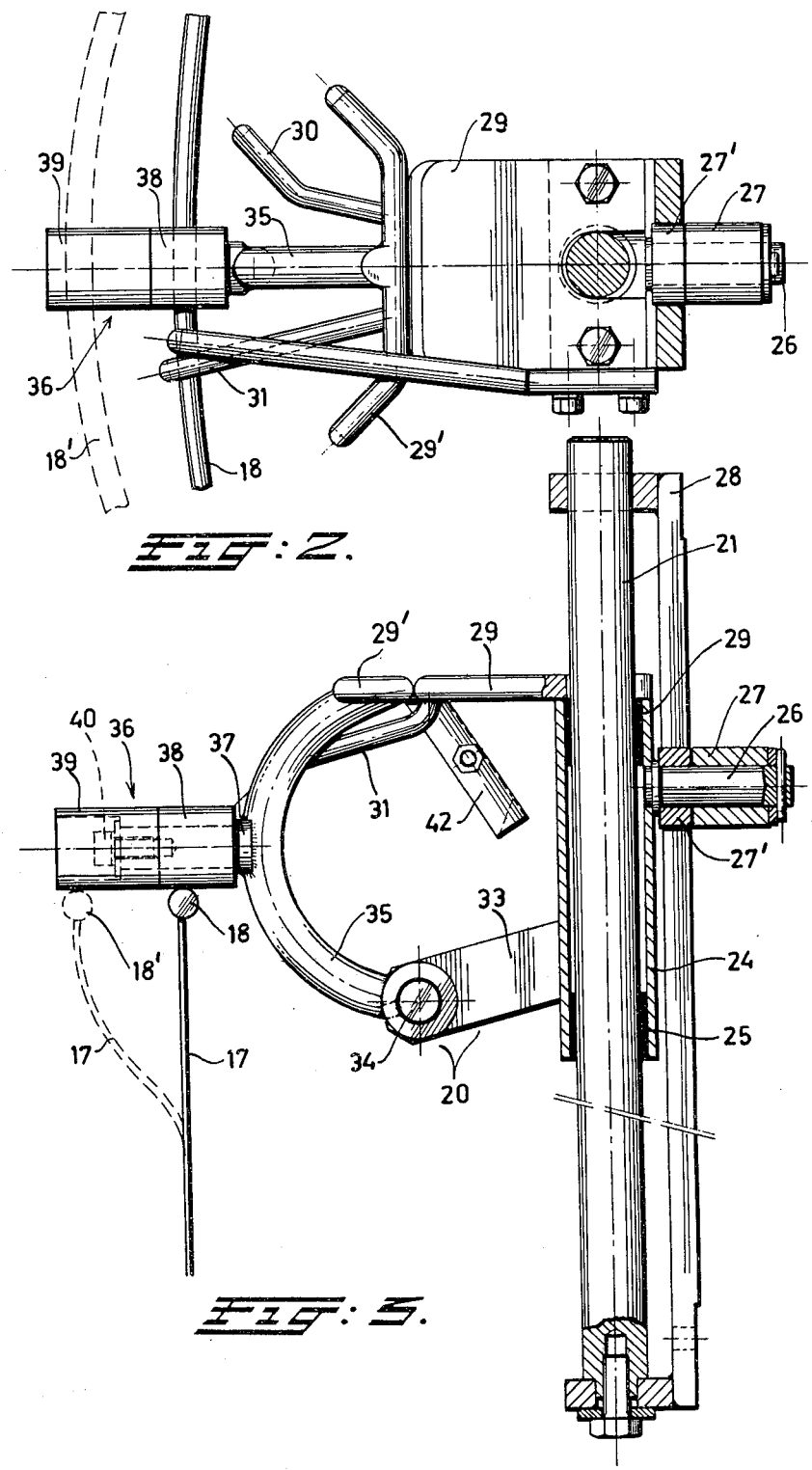

APPARATUS FOR REMOVING THE VERTICAL VERTEBRAE FROM THE NECK OF SLAUGHTERED FOWLS

BACKGROUND OF THE INVENTION

1. Field of the Invention

The present invention relates to apparatus for removing the cervical vertebrae from the skin of the neck of slaughtered fowls which, hanging by the legs, are moved forward on a conveyor, said apparatus comprising a frame movable along the track of the fowls, this frame bearing two cooperating clamping units slideable in vertical direction for drawing a part of the neck clamped between them vertically downwardly.

2. Description of the Prior Art

Apparatus for removing the cervical vertebrae from the neck of slaughtered fowls have been used in the prior art. In the prior art apparatus the clamping units are regularly spaced and cooperate with a movable breaking knife arranged between them and provided with a drive motor of its own; after the clamping units have gripped the neck, the breaking knife is pushed forcibly against the neck of the fowl, after which the clamping units are moved downward. Thus, first the cervical vertebrae are broken and then the cervical vertebrae enclosed by the clamping units are pulled out of the neck.

The difficulty with the prior art apparatus is that, apart from the complex construction, this apparatus has the drawback that a fowl with a bent neck is not properly treated, while the risk of a fowl being damaged is great. The discontinuous action makes it difficult to obtain a high production.

SUMMARY OF THE INVENTION

In view of the foregoing factors and conditions of the prior art it is a primary object of the present invention to overcome this drawback. This is attained according to the present invention, in that the clamping units comprise a fixed first clamping unit and a second clamping unit pivoting around a horizontal shaft, connected with a control unit which so cooperates with a guide with respect to which the frame is movable that, in case of a movement of the frame along the track, the second clamping unit starting from an open position in or near the upmost position is moved toward the first unit, the clamping units grip the neck of the fowl and are then moved downward jointly.

The use of two clamping units slideable toward and from each other of which the dimensions can be greater than the diameter of the neck, ensures that fowls with a bent neck are handled properly; the whole is considerably simpler and of cheaper construction than the prior art apparatus and the action is most reliable. Damage of the fowls is precluded.

In a favorable embodiment of the present invention the first clamping unit comprises a horizontal clamping edge with two diverging guide fingers radiating from the ends thereof, firmly connected with a bearer guided movably in the frame in vertical direction, and the second clamping unit, also comprises a horizontal clamping edge arranged at the end of a pivotal arm bearing a control unit, the other end of this pivotal arm being connected with the bearer in a pivoting point with a horizontal axis located under the clamping edges.

In practice it may occur that the clamping units not only grip the neck of the fowl but also a part of a wing which is then pulled off the body of the fowl in the downward movement of the clamping units. The fowl is then damaged and unfit for further treatment.

The present invention also overcomes this drawback. In a preferred embodiment, for this purpose a yielding member is incorporated in the control unit for the movement toward each other of the clamping units, this member being operative during at least part of the downward movement of these clamping units.

With the measure according to the present invention it is achieved that then the clamping units enclose not only the neck but also part of one or both wings; the yielding member gives the clamping units the possibility of receding with respect to each other, as a result of which it is prevented that the wings are torn off the body.

The control unit comprises preferably two aligned parts, one of which is solid and the other is elastically yielding and which, during the movement of the frame, cooperate with a guide edge with varying level of which the distance with respect to the frame so varies that during part of the guide track the yielding part contacts the guide edge.

The pivotal arm may bear a journal around which a first cylindrical member of solid material and a second at least partially hollow cylindrical member of elastically yielding material are arranged.

The pivotal arm may also bear a journal with a first member of solid material and a connecting springy member. The springy member may then be a plate spring or a bar spring.

The spring member may also be a spiral spring with narrowly connecting screw-windings.

The bearer is preferably coupled with a control cam which cooperates with a fixed guide curve and may bear a cutting knife directed toward the second clamping unit.

The frame, preferably jointly with a number of similar frames, is arranged in a frame rotating around a vertical shaft synchronously to be driven with the track.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings in which like reference symbols designate like parts throughout the figures.

DESCRIPTION OF THE DRAWINGS

FIG. 2 is a top-view of a bearer applied therein;

FIG. 3 is a part-view, part section of this bearer.

DESCRIPTION OF A PREFERRED EMBODIMENT

Figure 1:
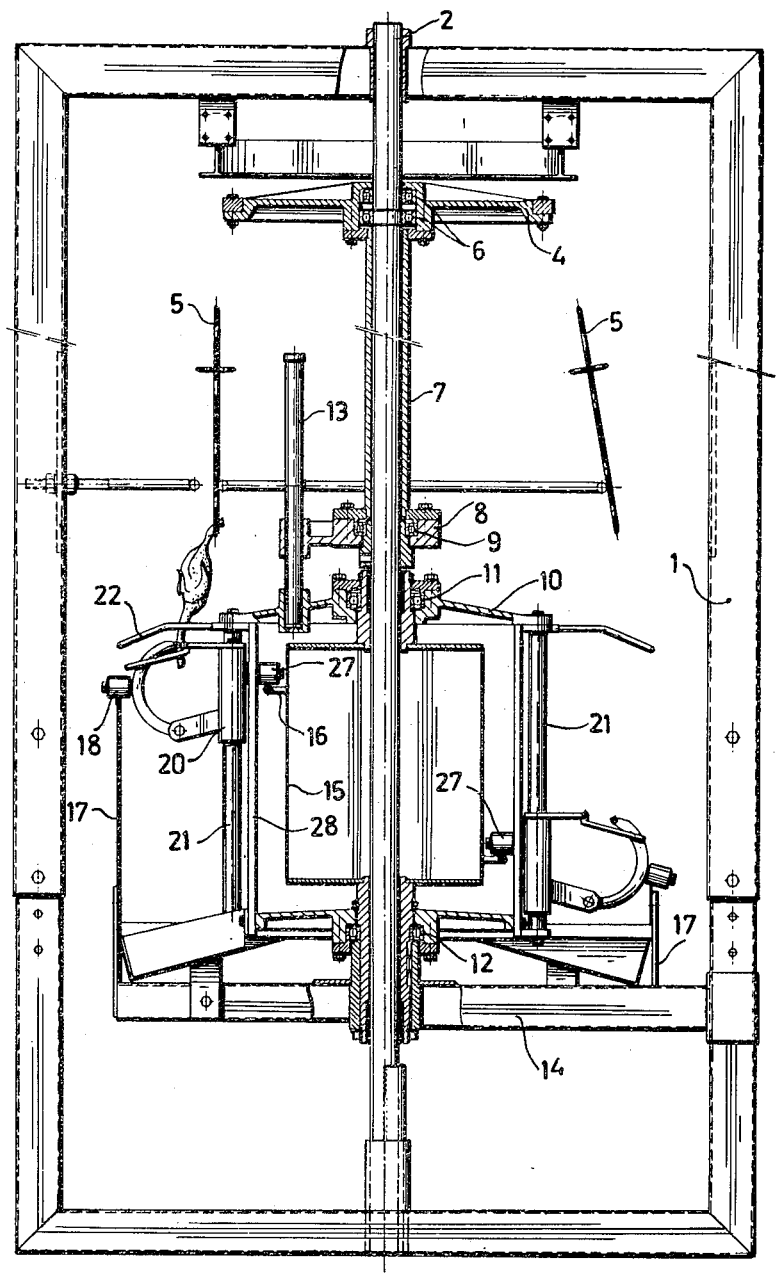
FIG. 1 is a half-view, half-section of an apparatus according to the present invention.

In order to best understand the present invention a description of a preferred embodiment thereof is provided accompanied by drawings. Initially referring to FIG. 1 a frame 1 carries a central supporting shaft 2. Around this supporting shaft, rotate as seen from top to bottom, a guide-wheel 4 for the conveyor (not shown) from which hooks 5 suspend; it is driven by the conveyor and rotates in the bearings 6; the catch-tube 7 with the catch-flange 8 rotating in the bearings 9; the frame-bearer 10 supported by the bearings 11 and 12.

Via the catch-rod 13 this frame-bearer 10 is coupled with the catch-flange 8 and the rotation thereof around the fixed shaft 2 is obtained from that of the driven wheel 4 via the catch-rod 13, the flange 8 and the box 7.

The auxiliary frame 14 which is adjustable in height, supports the frame bearer 10 which also bears the inner guide drum 15 with the guide curve 16 and furthermore bears directly the outer guide drum 17 of which the upper edge 18 also makes a guide curve.

The frame-bearer 10 bears a number of frames, each referenced numeral 20, each of which is movable along a guide-rod 21 which on the top and at the bottom is fastened to the frame bearer 10. Furthermore, at the place of this fastening a guide-rod 22 is arranged for the fowls which guide-rod is firmly connected with the frame-bearer.

Referring now to FIGS. 2 and 3 each frame comprises a bearer-sleeve 24 with sliding sleeves 25. To the bearer-sleeve is fixed the journal 26 with the cylindrical guide-cam, enclosed between the vertical rods 28 and cooperating with the guide 16. These members bring about the up and down movement of the bearer-sleeve 24 along the shaft 21. Furthermore, the sleeve 24 bears the first fixed clamping unit 29 with the guide-rod 30, 31 for the fowls and a fixed bearing arm 33. To this bearing arm, in the pivotal point 34, the bent pivotal arm 35 is connected with the end to which the second clamping unit 29' is fastened. The pivotal arm 35 furthermore bears the control unit referenced 36 which cooperates with the upper edge 18 of the firm guide 17.

According to the present invention, this control unit 36 is constructed in a special manner. It comprises a cylindrical journal 37 fixed to the arm 35 on which are arranged a first cylindrical part 38 of non-yielding material and a second cylindrical part 39 of yielding material. As can be seen particularly in FIG. 3, this part 39 is hollow on part of the length; part 39 and part 38 are held on journal 37 by means of screw 40.

In the upward movement of the control unit 36, as a result of the rising against the raised edge 18 of the drum 17, the clamping unit 29' is pressed against the clamping unit 29. When in this movement the sleeve 38 of non-yielding material contacts the edge 18, the clamping unit 29' will not be able to yield to the left. When, however, the hollow portion of the sleeve 39 is above the edge 18 (in FIG. 3 this situation is drawn in dots, the upper edge being indicated by reference numeral 18'), the clamping unit 29' will be able to move to the left over a certain distance as a result of the yielding of part 39.

The apparatus according to the present invention operates as follows:

As a result of the movement of the conveyor, which is guided on the guide 4, the frame-bearer 10 with therein the individual frames is driven rotatively around the supporting shaft 2, the frames performing an up and down movement caused by the cooperation of the journal 27 with the guide 16, and in this up and down movement the clamping units perform a movement directed toward and from each other due to the cooperation of the control unit 36 with the guide 18. This guide has for the greater part of the circumference, a fixed distance to the centerline of the apparatus, but for part of the circumference this distance is greater (as indicated by dotted lines in FIGS. 2 and 3). It is on this part of the circumference that the yielding shaft 39 contacts the guide 18. After putting a fowl into the frame, which takes place when this frame is in or near the upper portion (FIG. 1 left), a further movement of the frame around the supporting shaft 2, the rising edge 18 of the guide 17 will cause arm 35 to turn to the right, around the pivotal point 34, which results in the clamping unit 29' moving to the right and the clamping units 29, 29' to enclose the neck of the fowl. The column of cervical vertebrae is pinched through and in a downward movement of the frame with the clamping units the cervical vertebrae are pulled out of the skin of the neck.

It may easily occur that not only the neck but also a part of a wing is clamped between the clamping units 29 and 29'. Unless particular measures are taken, this wing is pulled entirely or partially from the body in the downward movement of the clamping units. In the apparatus according to the present invention, however, this is impossible because during the downward movement of the frame the non-yielding part 38 of the control journal 36 does not contact the edge 18 of the guide 17, but the yielding part 39 is there displaced outwardly to the position 18' on part of the circumference. Consequently the clamping unit 29' can yield to the left. Normally when there is no part of the wing between the clamping units this will not, or hardly happen and the clamping units will bring enough pressure to bear to press the cervical vertebrae already separated, out of the neck, but if there is a part of a wing between the clamping units the yielding will prevent that the wing is pulled off the fowl.

If desired, a knife 42 may be arranged on the frame (see FIG. 3) by means of which a cut is made in the skin of the neck during the removal.

What is claimed is:

1. Apparatus for removing the cervical vertebrae from the skin of the neck of slaughtered fowls which, hanging by the legs, are moved forward on a conveyor, comprising a frame movable along the track of the fowls, said frame bearing two cooperating clamping units slideable in vertical direction for drawing vertically downward a part of the neck clamped between them, said clamping units being made up of a fixed first clamping unit and a second clamping unit pivoting around a horizontal shaft, connected with a control unit which so cooperates with a guide with respect to which the frame is movable, that in a movement of the frame along the track the second clamping unit, starting from an open position in or near the upper position, is moved toward the first clamping unit, so that the clamping units enclose the neck of the fowl, and then are jointly moved downwardly.

2. Apparatus for removing the cervical vertebrae from the skin of the neck of slaughtered fowls according to claim 1, in which the first clamping unit comprises a horizontal clamping edge with two diverging guide fingers extending from the ends thereof, which are firmly connected with a bearer which is guided movably in vertical direction in the frame, the second clamping unit also comprising a horizontal clamping edge and being arranged at the end of a pivotal arm bearing the control unit, of which the other end is connected with the bearer in a pivotal point under the clamping edges.

3. Apparatus for removing the cervical vertebrae from the skin of the neck of slaughtered fowls according to claim 1, in which an elastic yielding member is incorporated in the control unit controlling the movement toward each other of the clamping units, this member being active during at least part of the downward movement of these clamping units.

4. Apparatus for removing the cervical vertebrae from the skin of the neck of slaughtered fowls according to claim 1, in which the control unit comprises two aligned parts, one of which being solid, the other being elastically yielding, and which during the movement of the frame cooperate with a guide edge with varying level, of which the distance with respect to the frame varies in such a manner that the yielding part contacts the guide edge during part of the guide track.

5. Apparatus for removing the cervical vertebrae from the skin of the neck of slaughtered fowls according to claim 4, in which the pivotal arm bears a journal on which are arranged a first cylindrical member made of solid material and a second at least partially hollow cylindrical member, made of elastic yielding material.

6. Apparatus for removing the cervical vertebrae from the skin of the neck of slaughtered fowls according to claim 4, in which the pivotal arm bears a journal with a first member made of solid material and a springy member connected therewith.

7. Apparatus for removing the cervical vertebrae from the skin of the neck of slaughtered fowls according to claim 6, wherein the springy member is a leave spring or a bar spring.

8. Apparatus for removing the cervical vertebrae from the skin of the neck of slaughtered fowls according to claim 6, in which the springy member comprises a helical spring with close windings.

9. Apparatus for removing the cervical vertebrae from the skin of the neck of slaughtered fowls according to claim 3, in which the bearer is coupled with a fixed control journal cooperating with a fixed guide curve.

10. Apparatus for removing the cervical vertebrae from the skin of the neck of slaughtered fowls according to claim 9, in which the bearer bears a cutting knife directed toward the second clamping unit.

11. Apparatus for removing the cervical vertebrae from the skin of the neck of slaughtered fowls according to claim 1 in which the frame together with a number of similar frames is incorporated in a main frame, which rotates, synchronously with the track, around a vertical shaft.

* * * * *